United States Patent [19]

Koshida et al.

[11] Patent Number: 5,013,911
[45] Date of Patent: May 7, 1991

[54] OPTICAL SENSOR UNIT WITH SEALED OPTICAL ELEMENT AND CABLE CONNECTOR

[75] Inventors: Yoshinori Koshida; Kemmi Ayukai; Shin-ichi Suto, all of Tokyo, Japan

[73] Assignee: Oki Electric Industry Co., Ltd., Tokyo, Japan

[21] Appl. No.: 357,136

[22] Filed: May 25, 1989

[30] Foreign Application Priority Data

May 27, 1988 [JP] Japan ............................... 63-130987
May 27, 1988 [JP] Japan ............................... 63-130988

[51] Int. Cl.⁵ ............................................... H01J 5/02
[52] U.S. Cl. ................................................... 250/239
[58] Field of Search ................... 250/239, 571, 223 R

[56] References Cited

U.S. PATENT DOCUMENTS

| | | | |
|---|---|---|---|
| 4,127,328 | 11/1978 | Gorgone et al. | 250/239 |
| 4,207,464 | 6/1980 | Fukuyama et al. | 250/239 |
| 4,211,923 | 7/1980 | Fukuyama et al. | 250/239 |
| 4,584,485 | 4/1986 | Powers et al. | 250/239 |
| 4,653,834 | 3/1987 | Norden | 250/239 |
| 4,816,673 | 3/1989 | Segerson et al. | 250/239 |
| 4,841,144 | 6/1989 | Goi et al. | 250/239 |

*Primary Examiner*—David C. Nelms
*Attorney, Agent, or Firm*—Panitch Schwarze Jacobs & Nadel

[57] ABSTRACT

An optical sensor unit for detecting a predetermined object to be detected comprises an optical element, a connector for connection to a wiring cable of an external equipment, and a printed circuit board having a predetermined printed wiring thereon for connecting the optical element to the connector while the optical element is completely sealed by the printed circuit board at the lower end thereof and by the case at the upper portion and sides thereof whereby reduction of quantity of the light emitted from the optical element due to collection of dust can be prevented and whereby the attachment and detachment operations of the optical sensor unit can be effected with ease.

5 Claims, 8 Drawing Sheets

OPTICAL SENSOR UNIT WITH SEALED OPTICAL ELEMENT AND CABLE CONNECTOR

BACKGROUND OF THE INVENTION

The present invention relates to an optical sensor unit adapted to be used in detecting precisely a position, a shape, a transfer speed, etc of the papers such as a bank note, a printing paper and the like which are transferred in a cash dispenser, a duplicating machine and the like.

The prior art optical sensor unit comprises a light emitting element and a light receiving element positioned opposite the emitting element while a transfer path composed of two transfer guides for guiding the papers is interposed between the light emitting element and the light receiving element for detecting the position, the shape transfer speed, etc. by measuring quantity of light received by the light receiving element which is varied in the company of the papers on the transfer path.

The arrangement of the prior art optical sensor unit will be described more in detail.

The light emitting element and the light receiving element composed of respectively LED, etc. are soldered on a printed circuit board and fixed thereto. The printed circuit board having a previously printed wiring pattern thereon is capable of connecting the light emitting element to the light receiving element by soldering a signal line of the external equipment on the printed circuit board. The printed circuit board is fixed to the transfer guides forming the transfer path by screwing a bracket fixed to the cash dispenser or the duplicating machine etc.

The light emitting element is housed in a rubber cylinder provided between the transfer guides and the printed circuit board to prevent dust, paper dust etc. attached to the papers from attaching to an optical element. The transfer guides have holes closed by transparent glasses and positioned with the optical sensor unit so as to transmit and receive the light of the optical sensor unit.

The light receiving element has same structure as the light emitting element and is positioned opposite the light emitting element so that both optical axes are aligned with each other.

There are following problems in the prior art optical sensor unit.

Firstly, the rubber tube is slightly pressed toward the transfer guides to prevent the optical sensor unit from being blocked by the dust, paper dust, etc. However, an impact resilience force generated by the pressing operation of the rubber tube toward the transfer guides makes the printed circuit board fixing the optical sensor unit (composed of light emitting and receiving elements) flexible whereby the optical axis of the light emitting element does not align with that of the light receiving element, namely, the axes are displaced with respect to each other. As a result, the light emitted from the light emitting element can not be accurately received by the light receiving element, which results in generating an erroneous operation. Accordingly, the fixing position of the bracket or the length of the rubber tube are required to be considerably accurate to obtain an appropriate pressing force of the rubber tube toward the transfer guides without displacing the optical axes of the optical sensor unit.

Furthermore, since the signal line from the exterior apparatus is directly soldered on the printed circuit board, it is difficult to detach the signal line from or attach the signal line to the bracket, which is liable to cause breaking of the signal line.

Still furthermore, it involves difficult work to exchange the optical sensor unit with another optical sensor unit since the signal line of the exterior apparatus is fixed and the printed circuit board is fixed to a bracket by the screw.

SUMMARY OF THE INVENTION

It is a first object of the present invention to provide an optical sensor unit capable of precisely detecting the position, shapes, etc. of the papers without displacing the optical axes of the light emitting and receiving elements constituting the optical sensor unit and preventing the reduction of quantity of light caused by attachment or collection of dust, etc. on the optical sensor unit.

It is another object of the present invention to provide an optical sensor unit capable of improving working efficiency by easy attachment or detachment of the optical sensor uit.

To achieve the above objects, the present invention comprises an optical element for detecting a predetermined objective to be detected, a connector connected to a cable of the exterior apparatus for supplying an output of the optical sensor unit to the exterior apparatus, a printed circuit board having a predetermined printed wiring pattern printed thereon for connecting the optical sensor unit and the connector by way of the wiring pattern, and a case surrounding the optical element so that the optical element can be completely and tightly sealed.

With the arrangement of the optical sensor unit according to the present invention, since the optical element is completely sealed in the manner that it is surrounded by the case at the upper and the side portions thereof, and by the printed circuit board at the bottom thereof, dust, etc. does not directly attach to the optical sensor unit.

Furthermore, the light emitted from the light emitting element can be received by the light receiving element which is positioned opposite the light emitting sensor. The optical axis of the light receiving element is aligned with that of the light emitting element when the printing medium is transferred along the transfer guides since the optical element and the case are fixed to the predetermined position.

Still furthermore, the attaching and detaching operation of the optical sensor unit can be made with ease in the manner that the optical sensor unit is inserted into the fixing hole or fixed to the bracket since the optical element, the connector, and the printed circuit board are integrally formed with the case.

Inasmuch as the optical element can be sealed completely while it is integrally formed with the connector and the printed cicuit board, it is possible firstly to detect correctly the information written on the printing medium and, secondly, to facilitate the attaching and detaching operations with ease and, thirdly, to reduce the number of parts of the optical sensor unit for thereby lowering the manufacturing cost.

The above and other objects, features and advantages of the present invention will become more apparent from the following description taken in conjunction with the accompanying drawings.

DESCRIPTION OF THE PREFERRED EMBODIMENT

Figure 1:
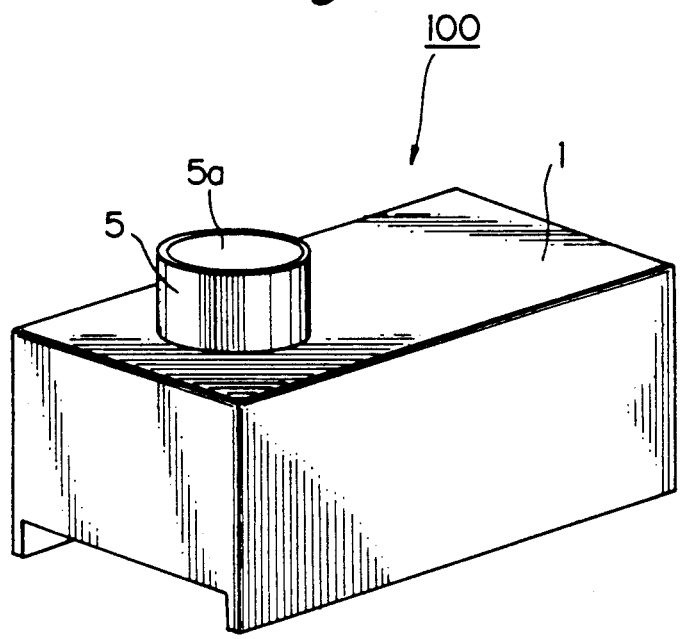
FIG. 1 is a perspective view of an optical sensor unit according to a first embodiment of the present invention.
Figure 3:
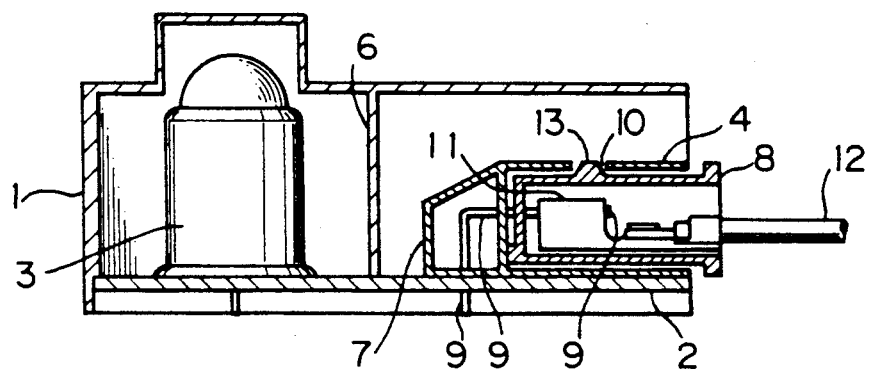
FIG. 3 is a cross section view of the optical sensor unit of FIG. 1.
Figure 2:
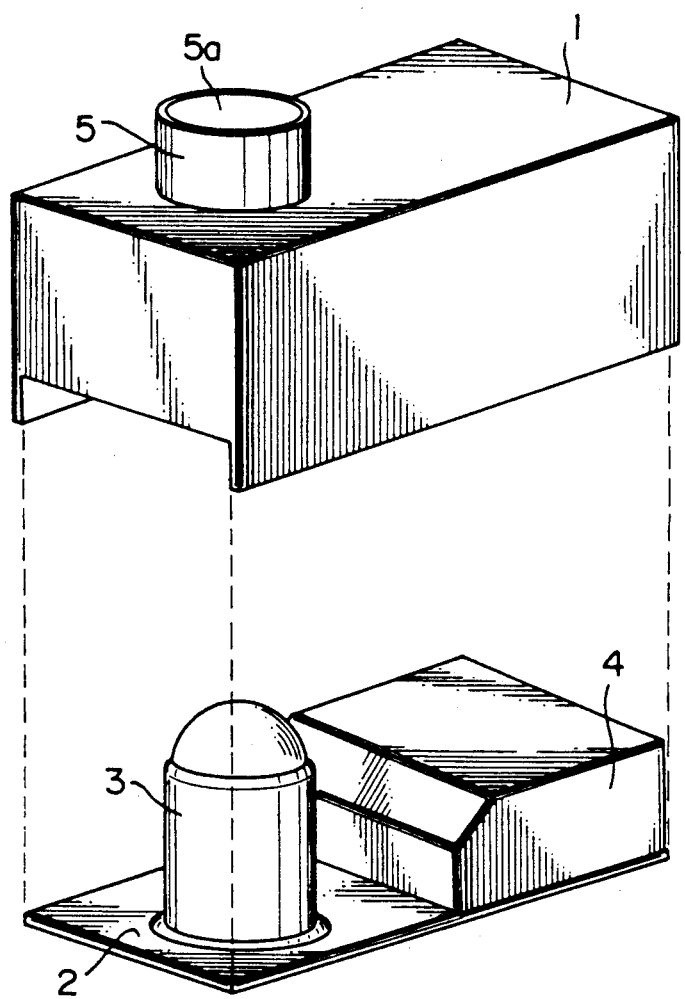
FIG. 2 is an exploded perspective view of the optical sensor unit of FIG. 1.

First Embodiment (FIGS. 1 to 3)

An optical sensor unit according to a first embodiment of the present invention will be described with reference to FIGS. 1 to 3.

An optical sensor 100 covered by a hard case 1 made of a synthetic resin etc. as a whole comprises an optical element 3 functioning both as light emitting sensor and light receiving sensor and fixed to a printed circuit board 2 by soldering etc., a connector 4 fixed to the printed circuit 2 by soldering etc. and connectable to exterior equipment (not shown) for supplying a power supply from the exterior equipment to the optical sensor unit 100.

The case 1 has a projection 5 provided with a transparent portion 5a capable of transmitting light emitted from the light emitting element and capable of fixing the optical sensor unit 100 by projecting it into a hole located in a predetermined position of a transfer guide (described later). The projection 5 is cylindrical as shown in FIGS. 1 to 3, but it is not limited to the cylindrical shape. The case 1 has a threshold plate 6 integrated therewith between the optical element 3 and the connector 4 so that the optical element 3 is completely and tightly sealed since the upper portion and the sides thereof are covered by the case 1 and the bottom thereof is covered by the printed circuit board 2. The printed circuit board 2 has a predetermined printed wiring by which the optical element 3 and the connector 4 are connected thereto.

The connector 4 will be described more in detail with reference to FIG. 3.

The connector 4 is made of a synthetic resin etc. and is composed of an outer housing 7 fixed to the printed circuit board 2 and an inner housing 8 to be inserted into the outer housing 7. The outer housing 7 has a pin 9 of an L-shape having one end to be connected to a receiver 11 (described later) and the other end soldered to the wiring pattern of the printed circuit board 2. The inner housing 8 has the receiver 11 positioned inside thereof and fixed thereto and connected to a wiring cable 12. A projection 13 is provided at the upper portion of the inner housing 8. When the inner housing 8 is inserted into the outer housing 7 in a predetermined position, the pin 9 is inserted into receiver 11 and connected thereto while the projection 13 of the inner housing 8 is held by a notched portion 10 defined in the upper portion of the outer housing 7 whereby the inner housng 8 is slightly locked by the outer housing 7.

Figure 4:
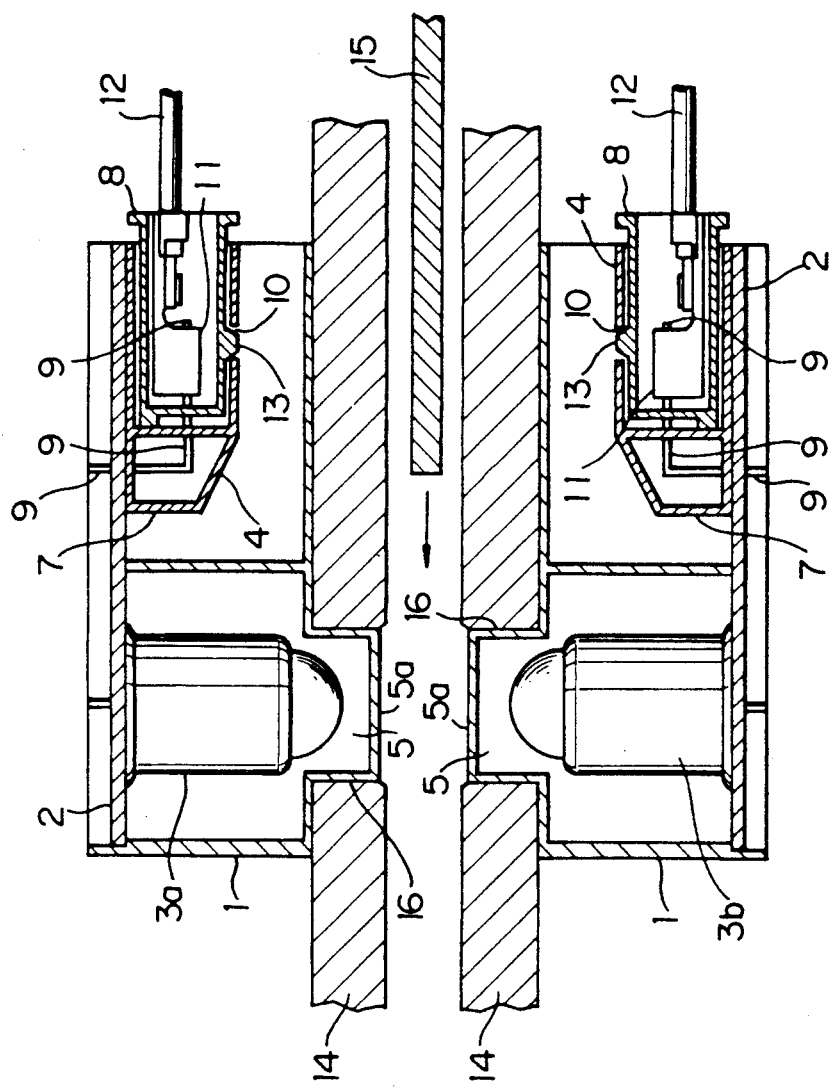
FIG. 4 is a cross sectional view of assistance in explaining the manner of use of the optical sensor unit of FIG. 1.
Figure 5:
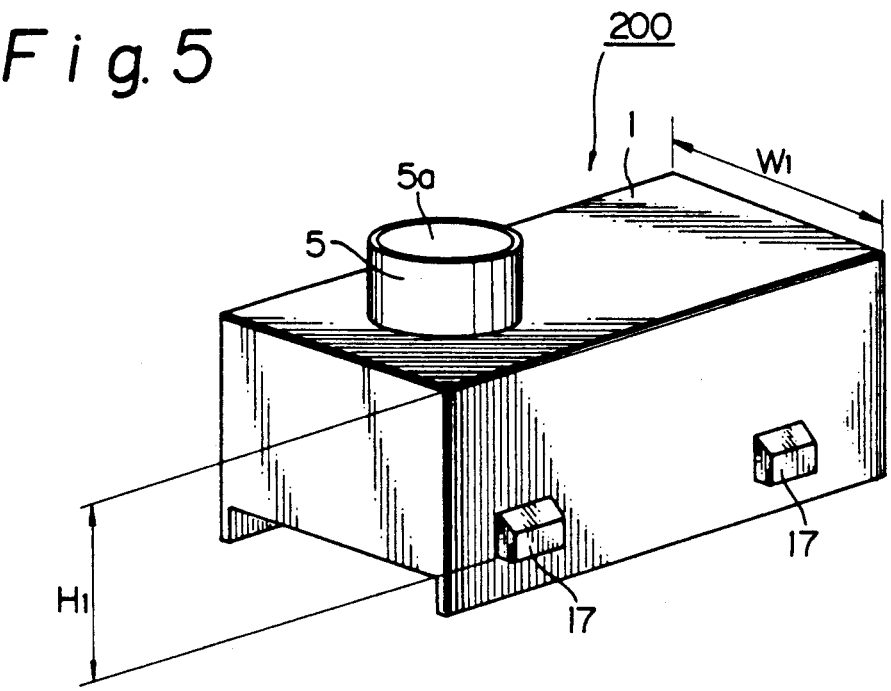
FIG. 5 is a perspective view of an optical sensor unit according to a second embodiment of the present invention.

An operation of the optical sensor unit 100 will be described in detail with reference to FIG. 4.

The arrangement of the optical sensor units 100 are symmetrically vertically arranged so that the light emitting element 3a and the light receiving element 3b can function normally.

The projections 5 of the cases 1 of the optical sensor units 100 are fixedly inserted into holes provided at transfer guides 14 for guiding a paper 15 so that the optical sensor units 5 are fixed to the transfer guides 14. The light emitting element 3a and the light receiving element 3b are arranged oppositely so that the optical axes thereof are aligned with each other.

The light emitting element emits a light on reception of the power supply supplied by the wiring cable 12 via the the receiver 11, the pin 9, and the wiring pattern of the printed circuit board 2. The light emitted from the light emitting element 3a crosses a transfer path composed of the transfer guides 14 and supplied to the light receiving element 3b via the projection 5 of the case 1 as the light transmitting portion. The light received by the light receiving element 3b is converted to an electrical signal which is supplied to the exterior equipment from the wiring cable via the wiring pattern of the printed circuit board 3, the pin 9, and the receiver 11.

When the papers 15 pass the space between the light emitting element 3a and the light receiving element 3b, the light emitted from the light emitting element is intercepted or attenuated by the papers 15 so that the output of the light receiving element 3b is changed. Therefore, the position of the papers can be detected from the output of the light receiving element 3b.

Inasmuch as the optical element 3 composed of the light emitting element 3a and the light receiving element 3b is completely sealed from the atmosphere by the case 1 and the circuit board 2, the optical element 3 can be protected from attachment of dust, paper dust, etc. There is a possibility, however, that the dust, the paper dust, etc. will attach the head portion 5a of the projection 5. However, when the papers 15 pass along the transfer guides 14, a wind pressure is generated which affects the head portion 5a of the projection 5 (or the papers 15 directly contact the head portion 5a) so that the dust, the paper dust etc. is hardly accumulated on the head portion 5a.

When external force is applied to the wiring cable 12 (to the right in FIG. 4) the outer housing 7 is elastically deformed so that the projection 13 of the inner housing 8 is released from the holding state by the notched portion 10 of the outer casing 7 whereby the inner housing 8 is detached from the outer housing 7. As a result, the wiring cable 12 is easily disconnected from the connector 4.

Second Embodiment (FIGS. 5 to 9)

An optical sensor unit of a second embodiment of the present invention will be described with reference to FIGS. 5 to 9.

An arrangement of an optical sensor unit 200 of the second embodiment is same as that of the first embodiment except projections 17 are provided in the optical sensor unit of the second embodiment. Hence, the same elements are denoted as the same symbols and the explanation thereof is omitted.

Figure 6:
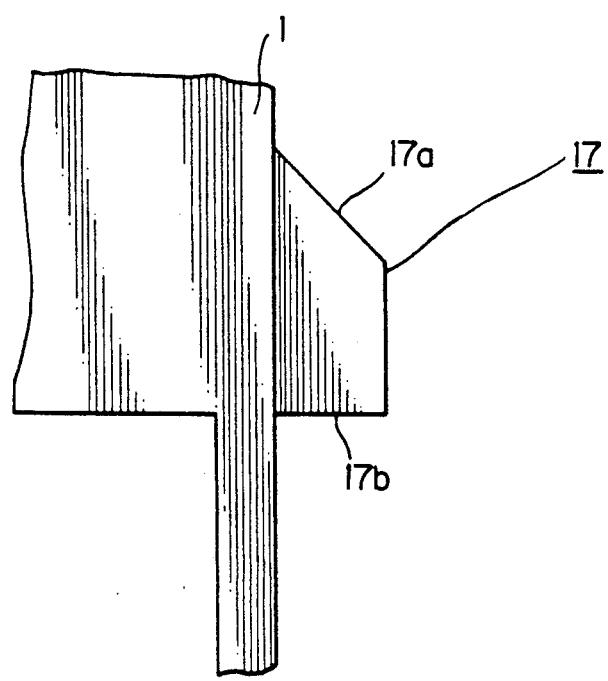
FIG. 6 is a front elevational view of holding projections of the optical sensor unit of FIG. 5.
Figure 7:
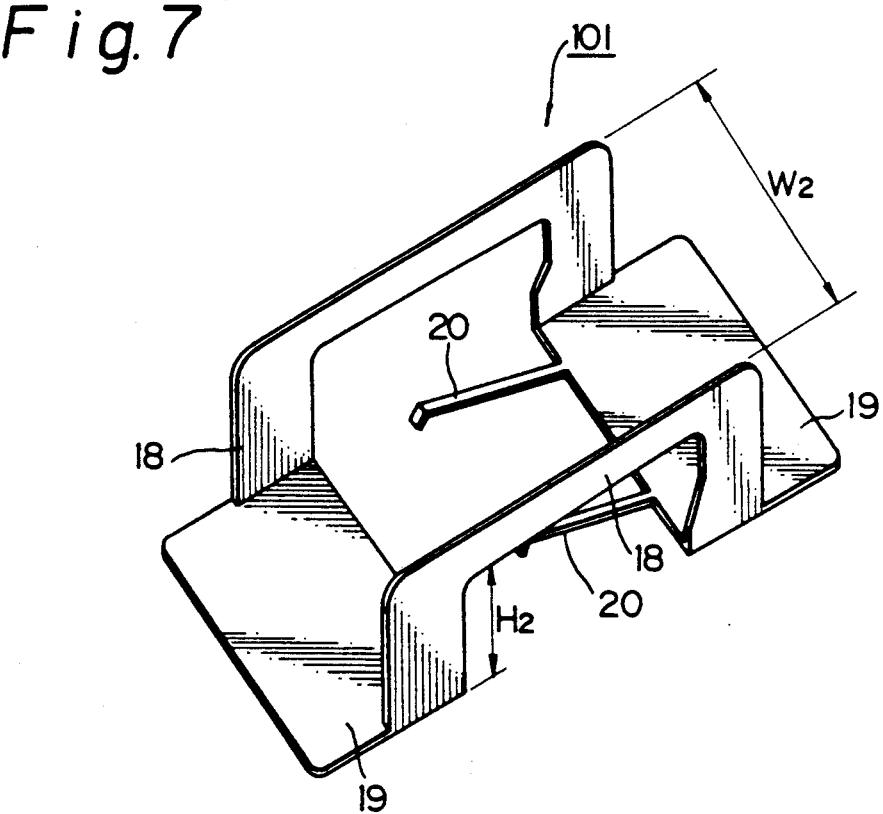
FIG. 7 is a bracket to wich the optical sensor unit of FIG. 5 is fixed.

The case 1 has a plurality of projections 17 at the right and left side walls thereof which are illustrated as an enlarged partial view in FIG. 6. The projection 17 has an inclined surface 17a inclined at a prescribed angle relative to the side wall of the case 1 and a holding surface 17b at the lower end portion thereof and extending perpendicular to the side wall of the case 1. The projections 17 are mounted on a fixing bracket 101 as illustrated in FIG. 7.

The fixing bracket 101 will be described with reference to FIG. 7. The fixing bracket 101 is made of a metal, a synthetic resin, etc. and comprises a base 19 and a pair of arms 18 integrally formed with the base 19 and extending first perpendicular to and then horizontally in parallel with the base 19, and a spring 20 projected from and angled to some extent relative to the base 19. The pair of arms 18 have a width W2 and a height H2.

Figure 8:
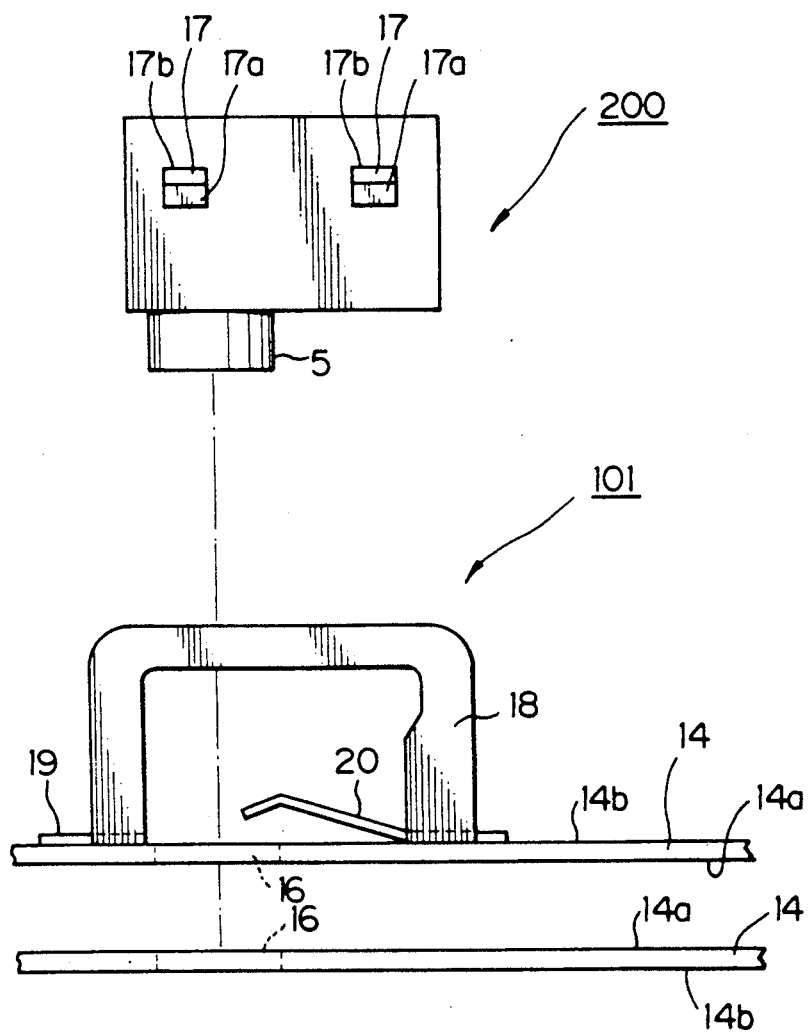
FIG. 8 is a side view of assistance in explaining attachment of the optical sensor of FIG. 5 to the bracket of FIG. 7.

A fixing operation of the optical sensor unit 200 to the fixing bracket 101 will be described with reference to FIG. 8.

Figure 9:
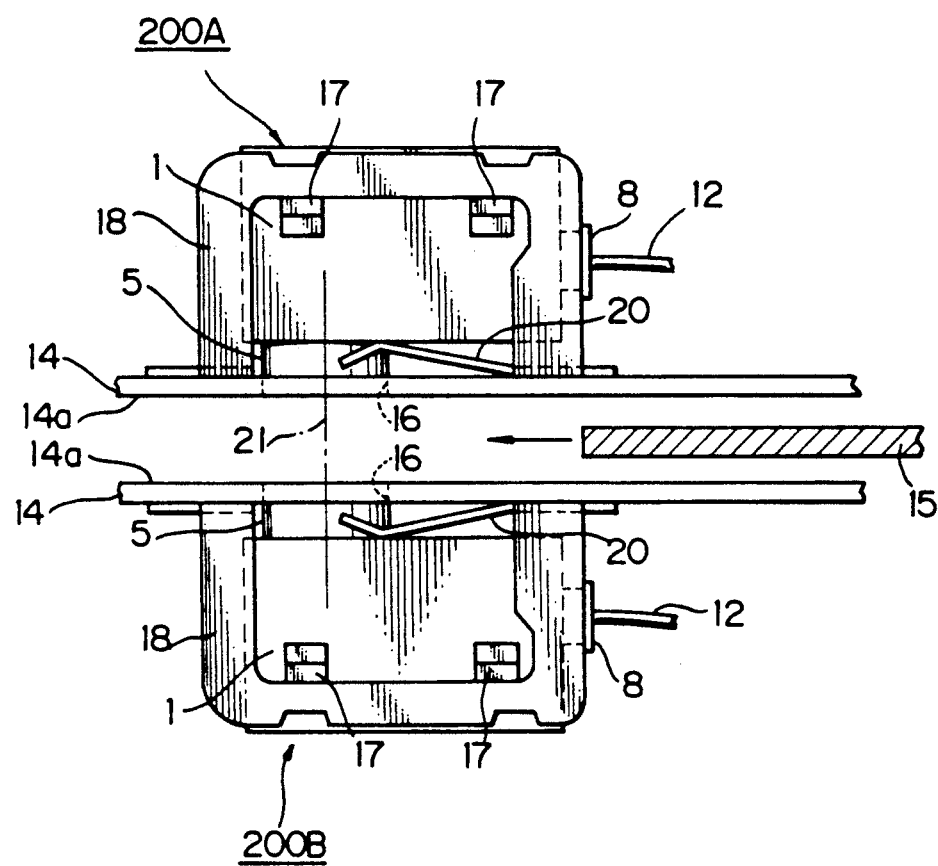
FIG. 9 is a side view of assistance in explaining the manner of use of the optical sensor unit of FIG. 5.

The fixing bracket 101 is welded or attached at the base thereof to the rear surface 14b of the transfer surface of the transfer guide 14 so that the fixing bracket 101 is fixedly mounted on the guide 14. The fixing bracket 101 is positioned at the location where the projection 5 of the case 1 of the optical sensor unit 200 is inserted into the hole provided at the transfer guide 14 while the optical sensor unit 200 is held and fixed by the pair of arms 18. The projections 5 of the cases 1 are inserted into the holes of the transfer guides 14 so that the optical sensor units 200 are oppositely positioned as illustrated in FIG. 9.

The optical sensor unit 200 (FIG. 5) has a width of W1 substantially corresponds to the width W2 of the pair of arms 18 (FIG. 7). Accordingly, if the projection 5 is positioned in confronting relation with the hole 16 of the transfer guide 14 and the optical sensor unit 200 is pressed toward the hole 16 the optical sensor unit 200 is pressed into the inside of the bracket 101. At the time when the optical sensor unit 200 reaches a predetermined position, the upper surface of the case 1, namely, the surface having the projection 5 is brought into contact with the spring 20. Further pressing of the case 1 against the resilience force of the spring 20 allows the projection 17 to contact with the upper end of the pair of arms 18. Since the upper surface of the projection 17 are inclined to form the inclined surfaces 17a, the pair of arms 18 are pressed by the inclined surfaces 17a and elastically deformed so that the pair of arms 18 are expanded at right and left. At the time when the the holding surfaces 17b of the projections 17 reach the lower ends of the pair of arms 18, the arms 18 return to their original positions by their own resilience forces. At this time, when the optical sensor unit 200 is released from pressing state, the holding surfaces 17b are pressed to the lower ends of the pair of arms 18 and held thereby by the resilience force of the spring 20 since the holding surfaces 17b are extended in substantially perpendicular relative to the side walls of the case 1. The projection 5 is fixedly inserted into the hole 16 of the transfer guide 14. With the operations set forth above, the optical sensor unit 200 is held by the fixing bracket 101.

As the height H1 between the holding surface 17b and the upper surface of the case 1 is set to be smaller than the height H2 of the pair of arms 18, the locking operation set forth above is certainly effected. The lower portion of the arm is in parallel with the transfer guide 14 and a plurality of holding surfaces 17b are positioned on a single flat surface so that the optical axis 21 is substantially perpendicular to the transfer guides 14 when the optical sensor unit 200 is locked by the fixing bracket 101.

The detachment opertion of the optical sensor unit 200 from the fixing bracket 101 is effected in the manner that the fixing bracket is forced to be expanded to right and left to allow the optical sensor unit 200 merely to be moved upward.

FIG. 9 shows a state where the optical sensor unit 200 is actually fixed to the fixing bracket 101. The light emitting sensor 200A is provided at the upper side of the transfer guide 14 and the light receiving sensor 200B is provided at the lower side of the transfer guide 14 while the holes 16 of the transfer guides 14 are positioned so that the center thereof are substantially aligned with each other. As a result, the optical axis of the light emitting sensor 200A is substantially aligned with that of the light receiving sensor 200B.

With the arrangement of the optical sensor unit according to the second embodiment of the present invention, the fixing brackets are fixed to the transfer guides 14 and the projections 17 of the optical sensor units 200 are held by the fixing brackets 101. The optical sensor units 200 can therefore be fixed to the brackets 101 with ease, and detachment and attachment operations, to be made, for example, at the time of exchange of the optical sensor unit 200 can be realized with ease.

Figure 10:
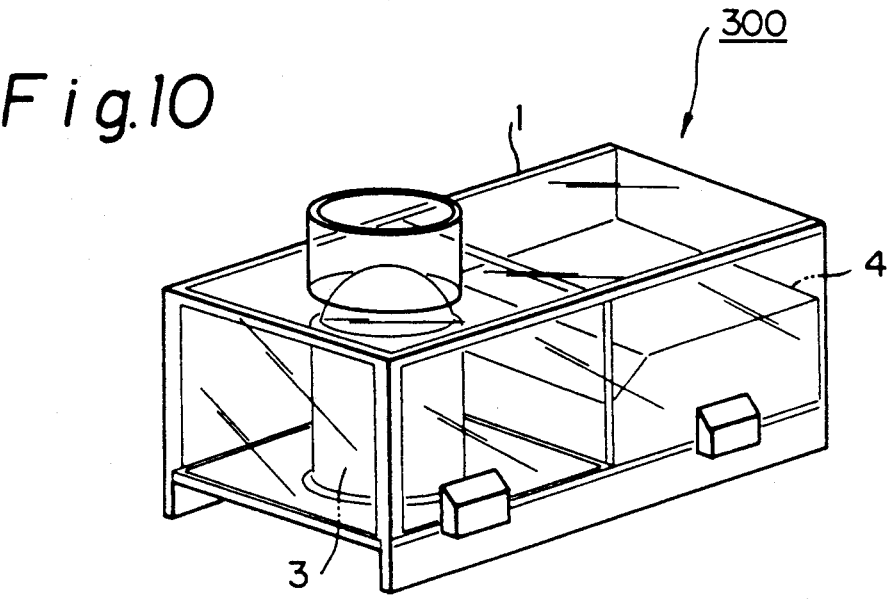
FIG. 10 is a perspective view of an optical sensor unit according to a third embodiment of the present invention.

Third Embodiment (FIG. 10)

An optical sensor unit of a third embodiment of the present invention will be described with reference to FIG. 10.

An arrangement of an optical sensor unit 300 of the third embodiment is same as that of the first and second embodiments except that the case 1 of the third embodiment is transparent. Hence, the same elements are denoted as the same symbols and the explanation thereof is omitted.

Since the case 1 is transparent as a whole, the fixing state of the optical sensor unit 300 can be immediately identified so that abnormal operation of the optical sensor unit can be detected effectively.

Figure 11:
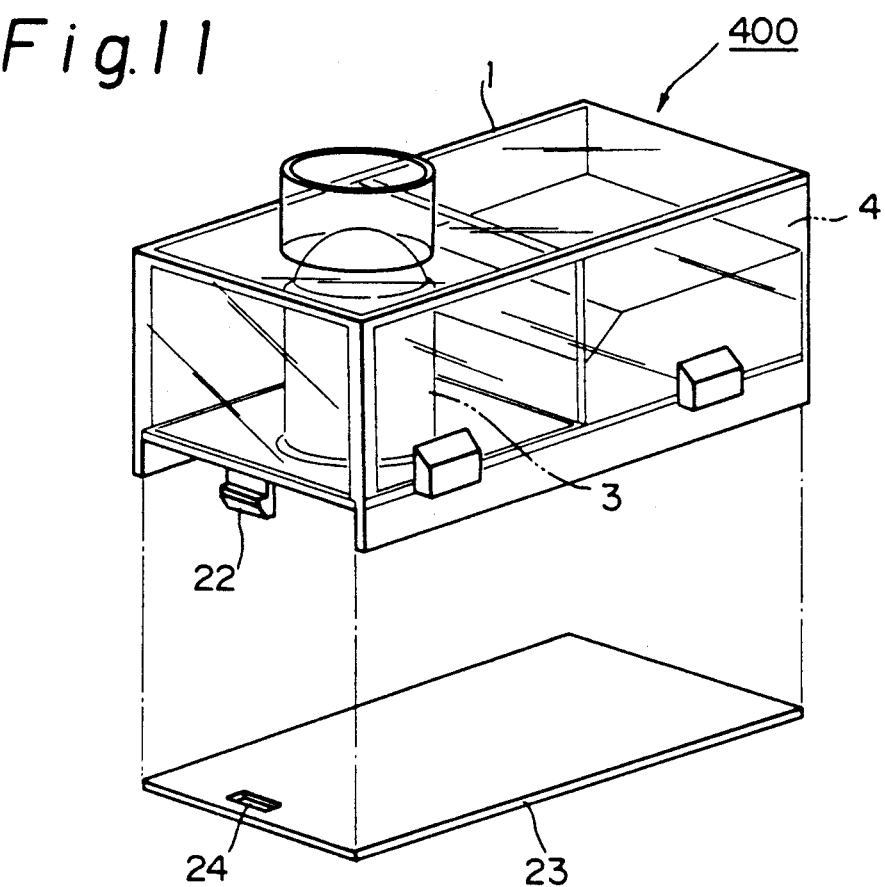
FIG. 11 is a view of an optical sensor unit according to a fourth embodiment of the present invention.
Figure 12:
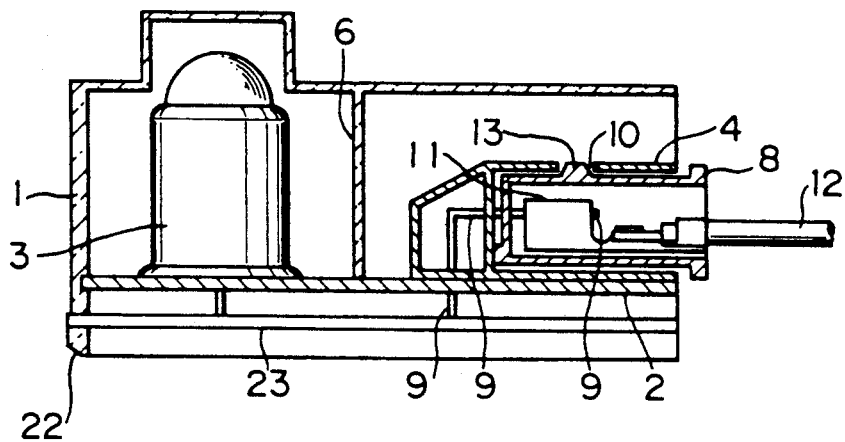
FIG. 12 is a cross sectional view of the optical sensor unit of FIG. 11.

Fourth Embodiment (FIG. 11 to 12)

An optical sensor unit of a fourth embodiment of the present invention will be described with reference to FIGS. 11 to 12.

An arrangement of an optical sensor unit 400 of the fourth embodiment is same as that of the first and second embodiments except that the optical sensor unit 400 has a cover 23 having a slit 24 under the printed circuit board 2 and a projection 22 extended downwardly from the printed circuit board 2 and engageable with the slit 24. Hence, the same elements are denoted as the same symbols and the explanation thereof is omitted.

The cover 23 covers the pin 9 as shown in FIG. 12 to thereby protect the pin 9 from exposure to the outside.

Although the invention has been described in its preferred form with a certain degree of particularity, it is to be understood that many variations and changes are possible in the invention without departing from the scope thereof.

What is claimed is:

1. An optical sensor unit comprising:

an optical element for detecting a predetermined object to be detected;

a case, formed of a single member, covering the optical element so that the optical element is tight sealed as a whole;

a connector positioned adjacent to the optical element for connecting the optical element to a wiring cable of external equipment, and for separating the optical element and the wiring cable from each other; and a printed circuit board having a predetermined wiring thereon for connecting the optical element to the connector.

2. An optical sensor unit according to claim 1, wherein a surface of the case through which the optical element emits and receives the light is transparent.

3. An optical sensor unit according to claim 2, wherein a part of the transparent surface of the case has a projection to be fixed a transfer guide at a predetermined position thereof.

4. An optical sensor unit according to claim 1, wherein said unit includes means for fixing said unit to a fixing bracket where the case has a plurality of projections adapted to be fixed to a fixing bracket, the fixing bracket having a base, a pair of arms integrated with the base and having a width corresponding to that of the optical sensor unit and a spring projected from an angled to some extent relative to the base.

5. An optical sensor unit according to claim 1, wherein the case has a projection to be engaged in a slit provided at a cover positioned under the printed circuit board for covering the lower portion of the optical sensor unit.

* * * * *